United States Patent Office 3,658,976
Patented Apr. 25, 1972

3,658,976
METHOD FOR PRODUCING ELECTRICALLY CONDUCTIVE TETRAFLUOROETHYLENE POLYMER TUBING
Winton Lloyd Slade, Lancaster, Pa., assignor to Raybestos-Manhattan, Inc., Manheim, Pa.
No Drawing. Original application May 22, 1962, Ser. No. 196,598, now Patent No. 3,473,087, dated Oct. 14, 1969. Divided and this application Apr. 10, 1969, Ser. No. 816,868
Int. Cl. B29f 5/02
U.S. Cl. 264—105
3 Claims

ABSTRACT OF THE DISCLOSURE

Electrically conductive polytetrafluoroethylene tubing having high resistance to seepage by low viscosity fluids is produced by extruding through an annular orifice a pressure-coalescing composition comprising unsintered colloidal tetrafluoroethylene polymer particles and carbon black. In making the composition, a minor portion of the polymer particles are coated with carbon black, and the coated particles are substantially uniformly distributed throughout the mass of polymer particles forming the pressure-coalescing composition to provide a total of from about 0.01 to about 0.5%, by weight, of carbon black. The extruded unsintered tubing is subsequently baked at a temperature above the sintering temperature of the polymer to produce the desired conductive tubing.

---

This is a division of application Ser. No. 196,598, filed May 22, 1962, now U.S. Pat. 3,473,087 issued Oct. 14, 1969.

This invention relates to hose or tubing comprising tetrafluoroethylene polymer, and more particularly to electrically conductive polytetrafluoroethylene tubing for conducting liquids which develop an electrostatic charge during flow.

It has been known for some time that fluids flowing in hose, tubing, pipes, etc. can develop an electrostatic charge. More recently it has been discovered that high voltage electrostatic charges sometimes accumulate inside polytetrafluoroethylene hoses conducting liquid hydrocarbons, such as aircraft fuels, even to potentials sufficient to break down the hose, causing it to fail. Apparently this is due to the extremely high electrical resistivity of polytetrafluoroethylene, by reason of which the rate of electrostatic charge dissipation through the polymer wall to the usual exterior wire reinforcement is exceeded by the rate of electrostatic charge generation inside the polymer tubing. The potential across the polymer wall thus builds up to a value exceeding the breakdown value. Destructive discharge then occurs through the polymer wall, causing leakage of fluids.

It has been proposed to overcome this problem by incorporating in paste-extruded polytetrafluoroethylene tubing a pulverulent electrically conductive material, such as carbon black. However, an amount of such electrically conductive material which will permit discharge of electrostatic charges radially out of the tube substantially lowers the resistance of the tube to "fuel cracking" or "fuel seepage." The latter terms refer to seepage of liquids which wet polytetrafluoroethylene, at points of high stress, such as in the spaces between exterior wire braid reinforcement plaits, and sealing zones of metal fittings. Typical of such liquids are hydrocarbons, such as toluol, isooctane, kerosene and jet fuel.

Although destructive electrostatic charges can be dissipated just as well longitudinally of the tubing to metallic end fittings as through the wall of the tubing to any exterior wire braid reinforcement, the longitudinal path is considerably longer and the longitudinal conductivity, therefore, must be correspondingly greater.

The incorporation of relatively small amounts of pulverulent electrically conductive material in polytetrafluoroethylene tubing, e.g. 0.25 to 0.75 percent, to overcome the problem of destructive static discharge may, on occasion, provide a bare minimum of the electrical conductivity required in the longitudinal direction. However, an easily measurable loss in fuel crack or fuel seepage resistance also results. Since the highest possible retention of fuel crack resistance is usually desirable, and frequently essential, for tubing or hose handling hydrocarbons, such as jet fuel in aircraft, this compromise cannot be considered an acceptable solution.

By further reducing the amount of carbon black in the tubing, for example to about 0.05 percent, or less, loss of fuel cracking resistance can be reduced, but no measurable increase in electrical conductivity radially or longitudinally of the tube is obtained over similar tubing not containing any electrically conductive material.

In summary, heretofore the inclusion of a pulverulent electrically conductive material, such as carbon black, in polytetrafluoroethylene paste compositions prior to extrusion of tubing therefrom has not resulted in tubing having the necessary electrical conductivity to dissipate charges of static electricity without sacrifice of the necessary fuel crack resistance. This has been the case regardless of the amount of electrically conductive material employed and the care taken to disperse the electrically conductive material as uniformly as possible throughout the paste and resulting tubing.

A primary object of this invention is to provide a method for producing a novel tetrafluoroethylene polymer tubing having an electrical conductivity adequate to prevent destructive discharge of static electricity created by fluids flowing therethrough as well as high resistance to seepage of fluids which wet the polymer surface.

Another object of this invention is the provision of a method for producing novel tubing of tetrafluoroethylene polymer which is particularly suitable for use as a liner for hose for aircraft and missiles by reason of its excellent electrical conductivity and high resistance to seepage of fluids.

A further object of this invention is to provide a novel method for producing conductive tetrafluoroethylene polymer tubing.

These and other objects and further advantages of this invention will become apparent from a consideration of the following specification and appended claims.

According to this invention there is provided a method for producing pressure-coalescing composition which comprises tetrafluoroethylene polymer particles of colloidal size intimately admixed with a volatile organic lubricant, from about 0.25 to about 30% of the particles, by weight, having pulverulent, inert, electrically conductive material having a particle size of the order of the particle size of carbon black on the surface thereof and being substantially uniformly distributed throughout the composition, the composition containing from about 0.05 to about 0.5% by weight of these electrically conductive particles, based on the weight of tetrafluoroethylene polymer.

This invention also contemplates a method for forming tubing from such a pressure-coalescing composition which comprises extruding the composition through an annular orifice to form unsintered tubing, and thereafter baking the tubing at a temperature above the sintering temperature of the polymer.

It was discovered that it is possible by a relatively simple procedure to incorporate a relatively small amount, e.g. 0.1%, of a pulverulent, inert, electrically conductive material, such as carbon black, into paste-extruded tetrafluoroethylene polymer hose or tubing in such a way as to increase its electrical conductivity longitudinally of the hose many orders of magnitude, as compared to prior known electrically conductive tubing of this general type, without any significant decrease in fuel seepage resistance or loss of other desirable physical properties of such hose. Thus, by means of this invention it is possible to fabricate a hose assembly, particularly useful for handling hydrocarbons such as fuels, hydraulic fluids and the like, in aircraft and missiles, which readily dissipates substantial electrostatic charges, caused by the flow of such fluids therethrough, to the nearest metallic end fitting or coupling, and performs outstandingly as regards resistance to fuel seepage even under relatively severe conditions of temperature and pressure.

More particularly, it was discovered that when a relatively small amount of carbon black or other pulverulent electrically conductive material is disposed in a relatively few smears or polymer fiber layers in unsintered tubing, running generally in the direction of extrusion thereof, and largely separated from each other, radially, by fiber layers of tetrafluoroethylene polymer which are substantially free of electrically conductive material, there are provided one or more unbroken, electrically conductive paths extending longitudinally of the hose. Apparently these conductive smears or fiber layers are in contact with like fiber layers at points spaced longitudinally of the hose, there being a sufficient number of points of contact so as to provide one or more unbroken conductive paths running for a substantial distance. These conductive paths or layers are retained in the sintered tubing. In addition to the electrical conductivity provided as stated hereinabove, the sintered hose thus produced has high radial fuel crack resistance, which appears to be attributable to the layers of polymer, substantially free of electrically conductive material, between conductive layers, which present barriers to crack propagation in the tubing wall.

The manner by which the above described stratification of conductive layers may be accomplished according to this invention comprises generally adhering pulverulent, electrically conductive material such as carbon black, to a small percentage of the total polymer particles from which the tubing is formed, and subsequently mixing these coated particles with other particles of the polymer and suitable lubricant to form a paste or pressure-coalescing composition which is thereafter extruded through a die. It appears that during extrusion the polymer particles coated with particulate electrically conductive material orient somewhat preferentially with respect to like coated particles so as to create a high degree of longitudinal continuity of electrically conductive smears or fiber layers.

In accomplishing the above-described advantageous results, substantially uniform blending of particles of tetrafluoroethylene polymer coated with electrically conductive pulverulent material and uncoated particles apparently is of considerable importance. This can best be accomplished by mixing a small portion, e.g. about 0.25 to about 30% of the polymer particles with a proportionate amount of liquid extrusion aid in electrically conductive particulate material to form a "pepper" mix. A "salt" mix comprising polymer particles and a proportionate amount of fluid lubricant is separately formed, and the "salt" and "pepper" mixes are combined by conventional techniques to obtain a substantially uniform mixture of the coated and uncoated polymer particles. During the mixing of the coated and uncoated particles, it appears that there is substantially no transfer of the particles of electrically conductive material from the "pepper" particles to the "salt" particles.

Whereas the invention will be described chiefly with respect to polytetrafluoroethylene (i.e. tetrafluoroethylene homopolymer), it is to be understood that the invention also applies to other tetrafluoroethylene-containing polymers, such as copolymers, which have a high degree of polymerization, a high sintering temperature, and which can be produced in the form of colloidal particles with those characteristic qualities of polytetrafluoroethylene which permit paste extrusion. Above the sintering temperature such polymers form a gel but do not actually melt to a liquid. Thus, the term "tetrafluoroethylene polymer" as used herein covers polymers and copolymers as hereinabove described.

As stated previously, the polymer particles used in this invention have colloidal dimensions. Particles of this type are obtainable by coagulating an aqueous colloidal suspension of the polymer. Processes for obtaining such aqueous suspensions and colloidal particles therefrom are not the subject of this invention, but are well known to those skilled in the art to which this invention pertains. In this connection reference is made to United States Patent No. 2,685,707.

The composition which is extruded into electrically conductive tubing according to this invention is a pressure-coalescing paste comprising, in addition to polymer particles and electrically conductive particles, a fluid organic lubricant or extrusion aid. Ordinarily such organic lubricant will be liquid under extrusion conditions and have a viscosity at 25° C. of at least about 0.45 centipoise. Examples of such organic lubricants are essentially saturated aliphatic and cyclo-aliphatic hydrocarbons, such as n-octane, n-nonane, n-decane, petrolatum, and hydrocarbon mixtures such as kerosene and VMP naphtha.

The proportion of organic lubricant in the pressure-coalescing composition to provide for smooth extrusion will vary in the range between about 15 and about 30 percent, 17 to 21 percent being preferred, based on the combined weight of polymer and lubricant.

The formation of pressure-coalescing compositions comprising tetrafluoroethylene polymer particles of colloidal size and an organic lubricant is well known, and in this connection reference is again made to United States Patent No. 2,685,707. In one aspect, this invention relates to improvements in such compositions as hereinafter more specifically set forth.

The electrically conductive material employed in this invention has a relatively fine particle size, is essentially inert chemically to fluids to be conducted through the resultant tubing, and is not changed chemically or decomposed under tetrafluoroethylene polymer sintering temperatures of the order of about 380° C. Ordinarily, the particles will have a particle size of that of carbon black. For example, the electrically conductive particles may have a particle size of the order of 10–90 millimicrons, 10–25 m$\mu$ being preferred. Acetylene blacks which are highly conductive may be used; however, they are not as easily coated uniformly on the colloidal sized tetrafluoroethylene polymer particles as other pulverulent or powdery graphites and carbon blacks. An excellent balance of such properties as electrical conductivity and the ability to uniformly coat polymer particles is possessed by carbon black having an average particle size of about 19 millimicrons formed by impingement techniques and known as Columbian Carbon #999 Carbon Black. Although finely divided carbon blacks are preferred, other particulate electrically conductive materials may be used provided they have the necessary small particle size, chemical inertness and ability to be coated on colloidal size particles of tetrafluoroethylene polymer.

The technique by which the "pepper" mix may be formed is not critical provided that portion of the polymer particles as specified herein is separately coated with particles of pulverulent electrically conductive material. For example, polymer particles and electrically conductive particles may be blended together in a substantially dry state. After blending has been completed, that portion of the total amount of organic lubricant required for the ultimate blend of "salt" and "pepper" corresponding to the proportion of polymer particles forming the "pepper" mix can be added to the substantially dry blend. Or the electrically conductive particles can be dispersed in the proper proportion of lubricant required for the "pepper" mix, and the proper quantity of polymer particles may be combined and mixed therewith. In certain cases, the polymer particles may be added to a dispersion of electrically conductive particles in the organic lubricant, and any excess lubricant can be removed by extraction by means of uncoated polymer particles. The last process is particularly useful where relatively a low percentage of coated polymer particles is desired in the final mix. Various combinations of these methods will be readily apparent to persons skilled in the art. The only controlling factor is to insure that only the desired percentage of polymer particles in the final mix is coated with electrically conductive particles. That percentage is generally in the range between about 0.25 and 30%, by weight of the total amount of polymer particles present in the paste. A preferred amount of coated particles is less than about 5%, from about 0.5 to about 2.5% being particularly preferred.

The quantity of electrically conductive particles used, based on weight of tetrafluoroethylene polymer in the final mix should be from about 0.01 to about 0.5 percent, from 0.1 to about 0.25 percent being particularly preferred.

As stated hereinabove, after the "pepper" mix has been separately prepared, as above, it is then combined with the "salt" mix by any of the blending procedures heretofore used in forming tetrafluoroethylene paste extrusion compositions. The "salt" mix, of course, is nothing more than the paste or pressure-coalescing compositions comprising tetrafluoroethylene polymer heretofore well known in the paste extrusion art.

The peculiar or special alignment of the polymer particles coated with electrically conductive material into conductive smears, streaks or layers cannot be achieved unless the tetrafluoroethylene polymer is of colloidal size and the composition is pressure-coalescing and is paste extruded through the orifice of a die. In general, it is observed that reduction ratio, i.e. ratio of the thickness of the side wall of the initial annular preform or billet of paste to be extruded to thickness of the wall of the extruded tube, greatly alters the longitudinal conductivity of the extrudate. Unlike preforms or billets comprising a uniform blend of electrically conductive particles and polymer particles, which preforms have a relatively high degree of conductivity, billets formed of paste compositions of this invention comprising a mixture containing a minor amount of particles coated with electrically conductive material have very poor conductivity. However, after extrusion of the respective billets or preform, extrudates made in accordance with this invention have a conductivity many orders of magnitude greater than those made from the prior known relatively homogeneous pastes in which the electrically conductive particles are uniformly dispersed throughout the pastes. Furthermore, with the novel pressure-coalescing compositions of this invention, as the reduction ratio increases, longitudinal electrical conductivity increases, whereas the converse is true for the prior homogeneous blends of conductive particles and polymer particles. In addition, the extrudates of this invention have high resistance to fuel seepage; on the other hand, those extrudates produced from the prior known homogeneous pastes have poor fuel seepage resistance.

Preferably, the reduction ratio employed in extruding according to the method of this invention is from about 50/1 to about 750/1 for paste compositions containing from about 0.5 to about 2.5 percent of particles coated with electrically conductive particles and from about 0.1 to about 0.25 percent of electrically conductive particles based on the polymer content of the composition.

The annular dies used in preparing tubing according to this invention may be any of the well known types heretofore employed in the paste extrusion of tetrafluoroethylene polymer. A preferred type of die for use in the present invention is disclosed in U.S. Pat. No. 3,008,187.

As stated herein above, the tubular unsintered extrudates produced according to this invention comprise fibers, i.e. polymer particles oriented in chains generally in the direction of extrusion, some of which are coated with electrically conductive material and are separated from like fibers, radially, by fibers comprising polymer particles not coated with electrically conductive material. The fibers comprising polymer particles coated with conductive particles are in contact with like fibers at points spaced longitudinally of the tubing so as to provide one or more, generally a plurality, of unbroken conductive paths.

After sintering of such tubing, although the fibrous nature of the tubing is no longer apparent, there remain chains of conductive particles separated by polymer, the chains also being in contact with like chains at points spaced longitudinally of the tubing to provide one or more, usually a plurality, of unbroken conductive paths extending for substantial lengths.

The sintering of tubing formed according to this invention involves removing the volatile lubricant and heating the extrudate to a temperature above the sintering temperature of the polymer, generally above about 370° C., for a period of time. Long sintering times, e.g. about 30 minutes, result in somewhat lower conductivities than are obtainable with relatively short, e.g. 5 minutes, sintering times. However, the longer sintering times favor higher fuel seepage resistance. Thus, sintering time can be varied to emphasize whichever property is particularly desired, or to obtain a balance of properties.

Although tubing produced according to this invention will ordinarily be formed from a preform of paste composition comprising a substantially uniform blend of the "salt" and "pepper" mixes described above because of the ease by which such a preform can be formed, tubing formed from composite preforms are also contemplated. For example, a tubular preform consisting of two concentric tubular charges, the outer of ordinary paste comprising polymer particles, and the inner comprising the paste of this invention, can be extruded to yield an extrudate consisting of two concentric, but attached, tubular extrusions, the inner one containing the conductive fibers according to this invention and the outer being free from such fibers. The resultant sintered tubing will be adequately conductive for longitudinal dissipation of electrostatic charges. In addition, the absence of conductive particles in the outer layer will increase the overall radial dielectric strength of the liner wall and will allow still higher potentials in the liner at the midpoint between metallic end fittings without danger of breakdown. The composite wall will also increase the overall resistance to the "fuel cracking" phenomena, thereby extending the useful life of the tubing under extreme conditions.

The following examples are illustrative of this invention, but are not intended as limiting the scope thereof in any respect.

EXAMPLE I 2.5 grams of Columbian Carbon #999 Carbon Black having an average particle size of about 19 m$\mu$ was rolled in a one quart jar with 25 grams of commercial extrusion grade polytetrafluoroethylene (Du Pont T6-C). After 5 min., rolling was stopped and 6 grams of white oil lubricant ("Deo-Base," L. Sonneborn) was added and rolled an additional 5 min. Separately, in a 2 gallon jar, 229 grams of white oil was rolled with 975 grams of T6-C for 5 min. to form a "salt" mix. The black "pepper" mix was then added to the white "salt" mix and the two mixes were rolled together an additional 5 min. The final mix was stored for one day in a closed container and then extruded by means of a conventional paste-extruder with 1½" diameter mandrel and 3½" diameter bore, through a 60° included angle, smooth die, so as to form a tubular extrudate approximately 7/32″ I.D. by 0.040″ wall. This tubing was heated at a rate to reach 371° C. in two hours in a batch oven to volatilize the white oil, and then sintered ½ hour at 371° C. Two foot pieces of the tubing were dropped, while still at 371° C., vertically into 21° C. water, in order to quench them.

For comparison, 2.5 grams of Columbian Carbon #999 Carbon Black was rolled for 15 min. with 1000 grams of T6–C in a 2 gallon jar. Then 231 grams of white oil was added, and rolled 5 min. This mix was converted into quenched tubing in identical manner to the preceding mix.

Samples of both tubings were then slit, lengthwise, along one side, opened up, and clamped in a test fixture for measuring longitudinal conductivity. The metal-to-metal spacing of the electrode clamps was 2¼″. D.C. voltages from 200 to 1200 were applied to each sample, and current flowing longitudinally through each sample was measured by means of a Keithley Electrometer, Model 600A. For each sample, currents and voltages were plotted on log paper. At the best straight line intercept with 675 volts (300 volts per inch) a current value was read, and recorded as the conductivity, in microamperes at 300 volts per inch.

The geometric average conductivity of ten samples made by the first method was 320 microamperes at 300 volts per inch. The geometric average conductivity of ten samples made by the second method was 0.00002 microampere at 300 volts per inch.

EXAMPLE II 25 grams of a 10% dispersion of Columbian Carbon #999 Carbon Black in white oil was poured into a 1 quart jar. 5 grams of extrusion grade polytetrafluoroethylene (T6–C) was added. This slurry was gently agitated for a few seconds and allowed to rest for an hour. The polytetrafluoroethylene particles absorbed most of the white oil, leaving a carbon black deposit on the surface of the polymer particles. The mass of swollen polymer particles was not stirred. 91 grams of additional polymer was poured on top of this mass, and the jar sealed. After 24 hours, much of the white oil had migrated from the swollen polymer mass in the bottom, up into the polymer layer above, but the carbon black remained on those polymer particles where initially deposited.

The contents of the jar were then put through a 10 mesh screen, with some mechanical agitation, and into a 3 gallon jar containing 904 grams of the same polymer which had been previously rolled for 15 min. with 212 grams of white oil. The combined mixes were then rolled in the 3 gallon jar for 15 min., stored in a closed container for a day, and then extruded, sintered, quenched, and tested in manner identical with Example I. The geometric average longitudinal conductivity of ten samples of 7/32″ tubing was 1700 microamperes at 300 volts per inch.

EXAMPLE III

Extrusion pastes were prepared in the manner of those in Example I. Portions of each paste were separately extruded through a smooth, conical die and through a fluted die designed to produce an angular divergence of fibers, as disclosed in FIG. 1 of U.S. Pat. No. 3,008,187. Sintering and testing procedure was identical with Example I. Geometric average longitudinal conductivities are set forth in Table I, below:

TABLE I

| Size of extrudate | Extrusion dies | Percent polymer particles coated | Microamperes at 300 volts per inch |
|---|---|---|---|
| 7/32″ x .040″ wall thickness | Fluted | 100 | 0.00002 |
| Do | do | 2.5 | 270 |
| 29/32″ x .047″ wall thickness | do | 100 | 0.0005 |
| Do | do | 2.5 | 3.0 |
| Do | Smooth | 100 | 0.002 |
| Do | do | 2.5 | 88 |

EXAMPLE IV 6.25 grams of Columbian Carbon #999 Carbon Black was rolled with 62.5 grams of extrusion grade polytetrafluoroethylene (T6–C) in a 1 gallon jar for 5 min. 15 grams of white oil was then added and rolling continued an additional 5 min. Separately, in a 1 cubic foot container, 572 grams of white oil was rolled with 2438 grams of the polymer (T6–C) for 5 min. to form a "salt" mix. The black "pepper" mix was then added to the "salt" mix and rolling was continued another 5 min. A microscopic examination of the final mix showed that approximately 2½% of the polymer particles were generally coated with carbon black, and well dispersed among the uncoated particles.

This mix was then stored in a closed container for a day, and extruded through the apparatus illustrated in FIG. 1 of U.S. Pat. No. 3,008,187 designed to produce an angular divergence of fibers, and yield a tubular extrudate approximately 7/32″ I.D. x .040″ wall thickness. The lubricant was vaporized from the extrudate, and the extrudate was sintered at 380° C., and then passed through a water spray to quench it, and cool it rapidly from above its gel point to well below 260° C. Later, it was overbraided with 0.011″ diameter stainless steel wire to produce a conventional "dash 4" medium pressure aircraft hose in accordance with a Military specification for polytetrafluoroethylene hose assemblies, MIL–H–25579A (USAF) Feb. 28, 1961. Separately for comparison, 12.5 grams of Columbian Carbon #999 Carbon Black was rolled for 15 min. with 2500 grams of the same polymer (T6–C) in a 1 cubic foot container. 587 grams of white oil was then added and rolling continued an additional 5 min. After storing for a day in a closed container, this mix was converted to "dash 4" hose in a manner identical with the proceeding.

Ten samples of each hose liner were tested for electrical conductivity in the manner of previous examples, and averaged.

Three random samples of each hose were coupled and tested for fuel resistance according to the following procedure:

(1) 18 hours, 1500 p.s.i., MIL–L–7808 oil, 232° C. (then cool, drain and flush).

(2) 2 hours, red-dyed MIL–S–3136 Type III test fluid, 1500 p.s.i., room temperature. Check for leakage with paper towel (then drain, clean, and dry).

(3) Pressurize 1000 p.s.i. air under water. After 15 min., collect air effusion escaping through hose wall (not fittings) by inverted burettes. Report effusion as cubic centimeters per min. per inch of hose length.

(4) Repeat steps 1–3 ten times, total.

(5) Fill samples with MIL–7808 oil, soak 4 hours, at −54° C., without pressure. Apply 1500 p.s.i. for 5 minutes, then release. Repeat pressurization 10 times.

(6) Report (a) evidence of leakage of red fluid on towels, all steps, (b) effusion, all steps, (c) cold step leakage, (d) fitting cracks after completion of tests.

Results of these tests are set forth in Table II, below:

TABLE II

| Group | Percent polymer particles coated | Microamperes 300 volts per inch | Air effusion (cc./min./in.) after— | |
|---|---|---|---|---|
| | | | 3 cycles | 10 cycles |
| First | 100 | 0.3 | [1] 2.1 | [1] 51.0 |
| | | | [1] 5.3 | [1] 57.3 |
| | | | [1] 6.8 | [1] 53.3 |
| Second | 2.5 | 330 | 0.0 | 6.2 |
| | | | 0.1 | 2.9 |
| | | | 0.1 | 3.6 |

[1] Red dyed fluid leakage on towels, fitting leakage, and liner cracks in fittings, at end of test.

What is claimed is:

1. A method of making electrically conductive tetrafluoroethylene polymer tubing which readily dissipates electrostatic charges created by the flow of fluids therethrough and is resistant to seepage by such fluids which comprises:
(a) mixing carbon black having an average particle size of from about 10 to about 90 millimicrons with a first portion of colloidal size tetrafluoroethylene polymer particles to cause said carbon black to adhere to said polymer particle surfaces;
(b) mixing said tetrafluoroethylene polymer particles having said adhering carbon black with a second portion of uncoated tetrafluoroethylene polymer particles of colloidal size and sufficient volatile organic lubricant to provide a pressure-coalescing composition in which from about 0.25 to about 30%, by weight, of said polymer particles, in said composition, have carbon black adhering to the surface thereof and are substantially uniformly distributed throughout said composition, said composition containing from about 0.01 to about 0.5%, by weight, of carbon black, based on the weight of tetrafluoroethylene polymer;
(c) extruding said pressure-coalescing composition through an annular orifice to form said composition into a tubular extrudate; and
(d) baking said tubular extrudate at a temperature above the sintering temperature of said polymer to form said electrically conductive tetrafluoroethylene polymer tubing.

2. The method according to claim 1 in which from about 0.5 to about 2.5% of said polymer particles have carbon black adhering to the surface thereof, and said pressure-coalescing composition contains from about 0.1 to about 0.25%, by weight, carbon black.

3. The method according to claim 2 in which said pressure-coalescing composition contains from about 17 to about 21%, by weight, of said volatile organic lubricant, based on the total weight of said polymer particles and said lubricant.

References Cited
UNITED STATES PATENTS

| | | | |
|---|---|---|---|
| 3,008,187 | 11/1961 | Slade | 264—119 |
| 3,054,761 | 9/1962 | Moore et al. | 264—127 |
| 3,152,082 | 10/1964 | Davis et al. | 264—127 |
| 3,295,166 | 1/1967 | Owings | 264—127 |

ROBERT F. WHITE, Primary Examiner

J. R. HALL, Assistant Examiner

U.S. Cl. X.R.

264—122, 127